United States Patent
Pospisil

(10) Patent No.: US 11,002,033 B2
(45) Date of Patent: May 11, 2021

(54) BLAST PROTECTION WALL INCLUDING CEMENTITIOUS PANEL

(71) Applicant: United States Gypsum Company, Chicago, IL (US)

(72) Inventor: Frank Pospisil, Oak Park, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/589,596

(22) Filed: Oct. 1, 2019

(65) Prior Publication Data
US 2020/0256078 A1    Aug. 13, 2020

Related U.S. Application Data

(60) Provisional application No. 62/803,444, filed on Feb. 9, 2019.

(51) Int. Cl.
| | | |
|---|---|---|
| E04H 9/06 | (2006.01) | |
| E04B 2/56 | (2006.01) | |
| F41H 5/24 | (2006.01) | |

(52) U.S. Cl.
CPC ............... *E04H 9/06* (2013.01); *E04B 2/56* (2013.01); *F41H 5/24* (2013.01)

(58) Field of Classification Search
CPC .............. E04H 9/06; F41H 5/24; E04B 2/56
See application file for complete search history.

(56) References Cited

U.S. PATENT DOCUMENTS

| | | | |
|---|---|---|---|
| 6,941,720 B2 * | 9/2005 | DeForde | E04C 2/043 52/783.14 |
| 6,986,812 B2 | 1/2006 | Dubey et al. | |
| 7,406,806 B2 | 8/2008 | Hallissy et al. | |
| 7,445,738 B2 | 11/2008 | Dubey et al. | |
| 7,670,520 B2 | 3/2010 | Dubey | |
| 7,685,921 B2 | 3/2010 | Dagher et al. | |
| 7,789,645 B2 | 9/2010 | Dubey et al. | |
| 8,030,377 B2 | 10/2011 | Dubey et al. | |
| 8,361,590 B2 | 1/2013 | Chakraborty et al. | |
| 8,464,493 B2 * | 6/2013 | Boone | E04B 1/3483 160/135 |
| 8,915,033 B2 * | 12/2014 | Daniels | E04B 1/942 52/232 |
| 9,375,899 B2 * | 6/2016 | Daniels | B32B 13/04 |
| 9,458,618 B1 * | 10/2016 | Woznuk | E04B 1/0007 |
| 9,499,980 B2 * | 11/2016 | Mathieu | E04C 2/049 |
| 10,094,133 B2 | 10/2018 | Hong Ting | |
| 10,132,597 B2 | 11/2018 | Pyles et al. | |
| 10,240,338 B2 * | 3/2019 | Durst | E04B 1/18 |

(Continued)

OTHER PUBLICATIONS

WO App. No. PCT/US2020/016805: PCT Search Report dated Jun. 4, 2020, (4 pages).

(Continued)

*Primary Examiner* — Rodney Mintz
(74) *Attorney, Agent, or Firm* — Greer, Burns & Crain, Ltd.

(57) ABSTRACT

A wall for a building that includes a framed wall structure including a top support, a bottom support, and opposing side supports connected together, and at least one intermediate support attached to the top support and the bottom support, and a blast panel made of a cementitious material attached to the framed wall structure.

15 Claims, 3 Drawing Sheets

(56) References Cited

U.S. PATENT DOCUMENTS

| | | | |
|---|---|---|---|
| 10,598,466 B2* | 3/2020 | Zehnter | E04H 9/04 |
| 10,640,422 B2* | 5/2020 | Ong | C04B 24/023 |
| 2002/0139082 A1* | 10/2002 | DeFord | E04C 2/3405 52/783.1 |
| 2003/0089061 A1* | 5/2003 | DeFord | E04C 2/3405 52/309.9 |
| 2007/0175126 A1* | 8/2007 | Tonyan | C04B 7/02 52/223.7 |
| 2007/0228612 A1* | 10/2007 | Durst | F41H 5/24 264/333 |
| 2009/0239977 A1* | 9/2009 | Dubey | C04B 28/04 524/5 |
| 2010/0229715 A1* | 9/2010 | Tonyan | C04B 28/04 89/36.02 |
| 2011/0000514 A1* | 1/2011 | Boone | E04B 1/3441 135/123 |
| 2011/0023759 A1* | 2/2011 | Waller | F41H 5/24 109/79 |
| 2013/0019742 A1 | 1/2013 | Lecarpentier et al. | |
| 2014/0000195 A1* | 1/2014 | Daniels | B32B 21/04 52/232 |
| 2014/0000196 A1* | 1/2014 | Daniels | E06B 3/822 52/232 |
| 2014/0130438 A1 | 5/2014 | Durst et al. | |
| 2014/0273684 A1* | 9/2014 | Ali | E04B 1/942 442/1 |
| 2015/0079356 A1* | 3/2015 | Mathieu | E04C 2/28 428/192 |
| 2015/0158767 A1* | 6/2015 | Ong | C04B 14/00 521/56 |
| 2015/0308791 A1* | 10/2015 | Navarra | F41H 5/24 89/36.02 |
| 2019/0113311 A1* | 4/2019 | Zehnter | F41H 5/04 |
| 2020/0141109 A1* | 5/2020 | Pospisil | E04B 1/0015 |

OTHER PUBLICATIONS

WO App. No. PCT/US2020/016805: PCT Notification of Transmittal of the International Search Report and the Written Opinion of the International Searching Authority dated Jun. 4, 2020 (12 pages).

* cited by examiner

BLAST PROTECTION WALL INCLUDING CEMENTITIOUS PANEL

BACKGROUND

The present invention relates generally to a framed wall structure for buildings, and more specifically, to a blast protection wall used in a framed wall structure for buildings.

Certain residential and commercial buildings require reinforced walls to withstand forces from a blast generated by an explosion. For example, such reinforced walls are commonly used in constructing governmental, judicial and defense related buildings. The reinforced walls are also used in residential buildings that are in or around governmental, judicial or defense related buildings, such as military bases, or similar areas. Conventional framing structures used for blast protection typically use pre-cast or poured reinforced cement walls, framing structures with walls including a metal core, such as a steel core, or framing structures with walls that are reinforced with steel panels.

These framing structures require significant time and money to construct due the complexity of the walls and the numerous steps needed to construct the walls, which includes building the frame, pouring the concrete and/or attaching the steel panels. Additionally, the conventional framing structures used for blast protection are significantly heavier in weight than standard framing structures. In particular, the additional weight of conventional blast protection walls makes it more difficult to pre-fabricate and transport such walls, and modular units including these walls, to a job site.

Thus, there is a need for a blast protection walls for framing structures used in residential and commercial buildings that require less materials and that are lighter in weight.

SUMMARY

The above-listed need is met or exceeded by the present blast panel made of a cementitious material, which is configured to be attached to at least one framed wall structure in a residential or commercial building to provide protection against forces generated during an explosion up to 10 psi/89 psi-ms or greater.

In an embodiment, a wall for a building is provided and includes a framed wall structure including a top support, a bottom support, and opposing side supports connected together, and at least one intermediate support attached to the top support and the bottom support, and a blast panel made of a cementitious material attached to the framed wall structure.

In another embodiment, a modular assembly for a building is provided and includes a plurality of framed wall structures secured to each other, each of the framed wall structures including a top support, a bottom support, and opposing side supports connected together and at least one intermediate support attached to the top support and the bottom support, and a blast panel made of a cementitious material attached to at least one of the plurality of framed wall structures.

DETAILED DESCRIPTION

Figure 1:
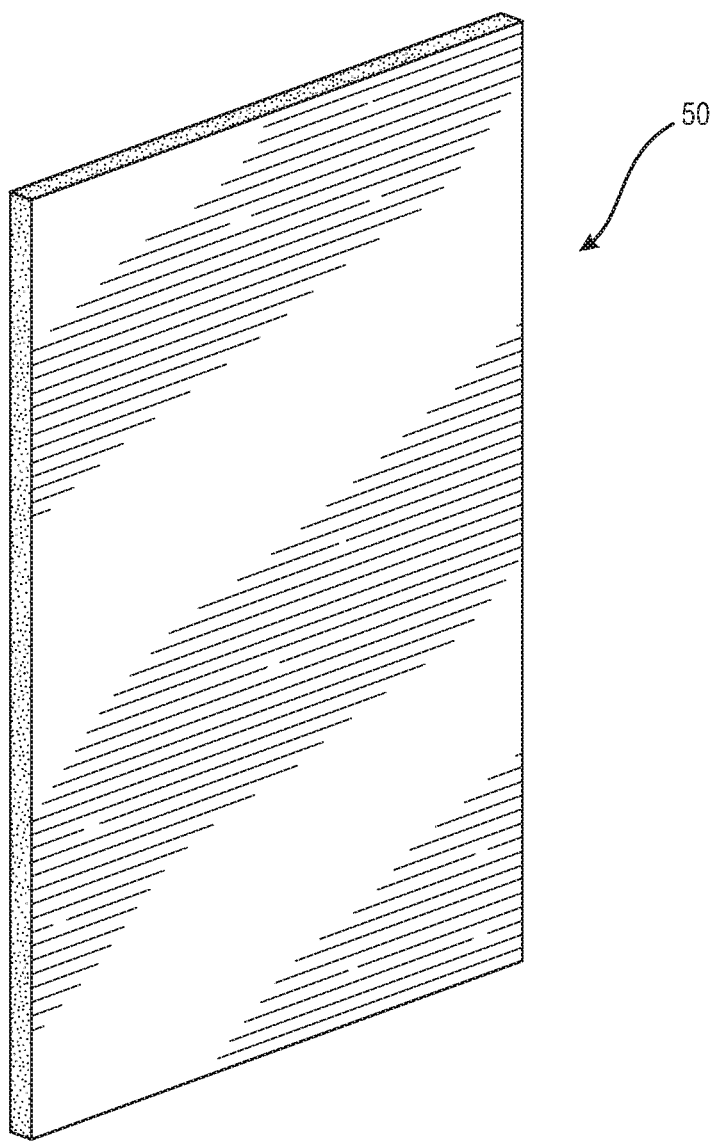
FIG. 1 is a schematic view of the present blast panel.

Referring now to FIG. 1, the present blast resistant prefabricated wall panel or blast panel generally indicated by reference number 50, is a structural cementitious panel as described in U.S. Pat. Nos. 6,986,812; 7,445,738; 7,670,520; 7,789,645; and 8,030,377, which are all incorporated herein by reference. In one embodiment, the blast panel 50 is made of a cement-gypsum binder including alkali-resistant fiberglass fibers. One or more of the blast panels 50 are attached to a building structure, such as a framed wall structure, to resist forces generated by explosive blasts, where the forces are up to 10 psi/89 psi-ms or greater. Note that psi is pounds per square-inch and psi-ms is pounds per square inch-milliseconds.

Figure 2:
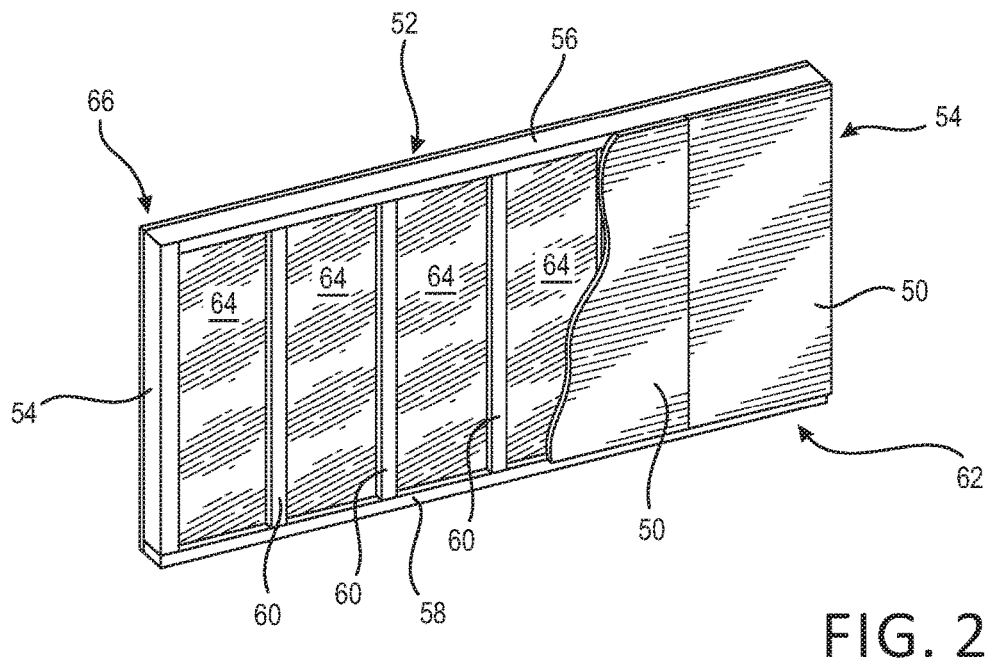
FIG. 2 is a schematic view of a framing structure including a plurality of the blast panels of FIG. 1

In an embodiment shown in FIG. 2, a plurality of the blast panels 50 are attached to a wood or steel framed wall structure 52 in a residential or commercial building. In the illustrated embodiment, the framed wall structure 52 includes opposing side supports 54, a top support 56 and a bottom support 58 connected to the ends of the side supports. A plurality of intermediate supports 60 are attached to the top and bottom supports 56 and 58. The side supports 54, the top support 56, the bottom support 58 and the intermediate supports 60 may be made of wood or steel. It is also contemplated that a composite material may be used to make the supports 54, 56, 58 and 60 As shown in FIG. 2, the blast panels 50 are attached to both sides of the framed wall structure 52 to provide enhanced blast protection. Alternatively, the blast panels 50 may be attached to only one side of the framed wall structure 52. It should be appreciated that one or more layers of the blast panels 50 may be attached to one side or both sides of the framed wall structure 52. In another embodiment, a plurality of the blast panels 50 are attached to an outer side 62 of the framed wall structure 52, and a plurality of finishing panels 64, such as wallboard panels, are attached to an opposing inner side 66 of the framed wall structure 52. Alternatively, the inner side 66 of the framed wall structure 52 may be finished with plaster, wood panels or other finishing materials. In the above embodiments, the blast panels 50 are attached to the framed wall structure 52 using fasteners, such as screws or nails. To cover the fastener holes and the seams between the blast panels 50, a joint compound (not shown) is applied to and spread over the holes and seams. The joint compound may be a conventional joint compound, a fire-resistant joint compound or any suitable joint compound. It should be appreciated that the framed wall structure 52 may include openings for doors and windows or for other construction components, such as pipes and wires. Also, the above embodiments describe the blast panels 50 being mounted on the outer side, inner side and both the outer side and inner side of the framed wall structure. In another embodiment, the blast panels 50 are mounted on a side of supports that are mounted to the top surface and extend across the framed wall structure to form a ceiling of a room or rooms in a residential or commercial building. The blast panels 50 may also be mounted on floor supports such as trusses to form a subfloor that is located beneath a finished floor.

Figure 3:
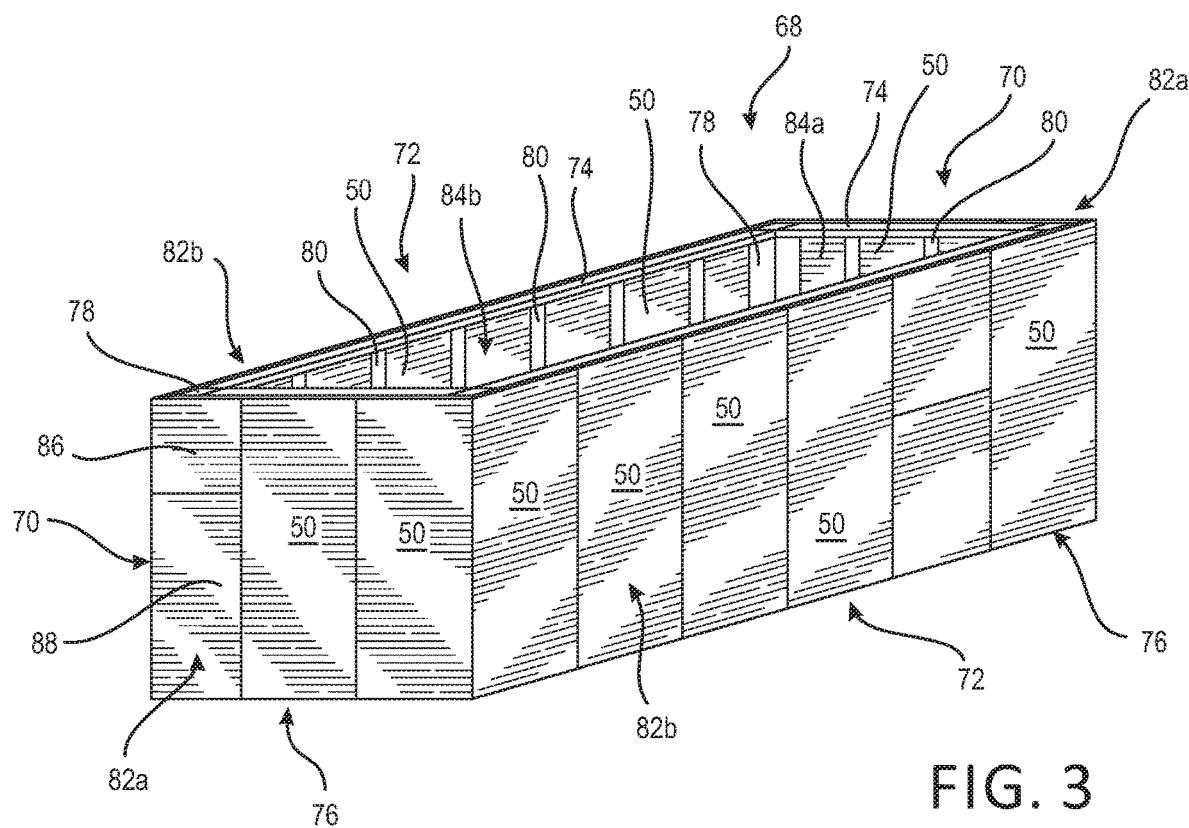
FIG. 3 is a schematic view of a modular structure including a plurality of the blast panels of FIG. 1.

Referring to FIG. 3, a modular assembly 68 is constructed and includes four framed wall structures. Specifically, two opposing end wall structures 70 are attached to two opposing side wall structures 72 to form the modular assembly 68.

As described above, each of the end wall structures 70 and the side wall structures 72 include a top support 74, a bottom support 76 and opposing side supports 78 to form the outer periphery of the wall structures. A plurality of intermediate supports 80 are attached to the top and bottom supports 74, 76 to form the wall structures. As shown in FIG. 3, a plurality of the blast panels 50 are attached to the outer sides 82*a* and 82*b* of the end wall and side wall structures 70, 72 with fasteners. The end wall structures 70 and the side wall structures 72 are attached together using fasteners, before or after the blast panels 50 are attached to the wall structures, to form the modular assembly 68. The modular assembly 68 may be constructed at a remote location and transported to a job site to be installed on a sub-grade foundation or on gravel, to form a sub-grade area such as a basement, or installed on an above-grade foundation or on trusses set on a sub-grade structure to form one or more floors of a residential or commercial building. It should be appreciated that the modular assembly 68 may have suitable number of framed wall structures and may be constructed to have any shape or combination of shapes. Also, two or more of the modular assemblies 68 may be attached together to form a larger area in a residential or commercial building. In another embodiment, the inner sides 84*a*, 84*b* of the framed wall structures forming the modular assembly 68 also includes a plurality of blast panels 50 attached to the framed wall structures using fasteners. Alternatively, the inner sides 84*a*, 84*b* of the modular assembly 68 may be finished with wallboard panels, wood panels, plaster or any suitable finishing materials. As shown in FIG. 3, the blast panels 50 may be manufactured or cut to different sizes, such as blast panels 86 and 88, to cover a framed wall structure or similar structure. Also, the fastener holes and seams on and between the panels may be finished with a joint compound as described above.

Figure 4:
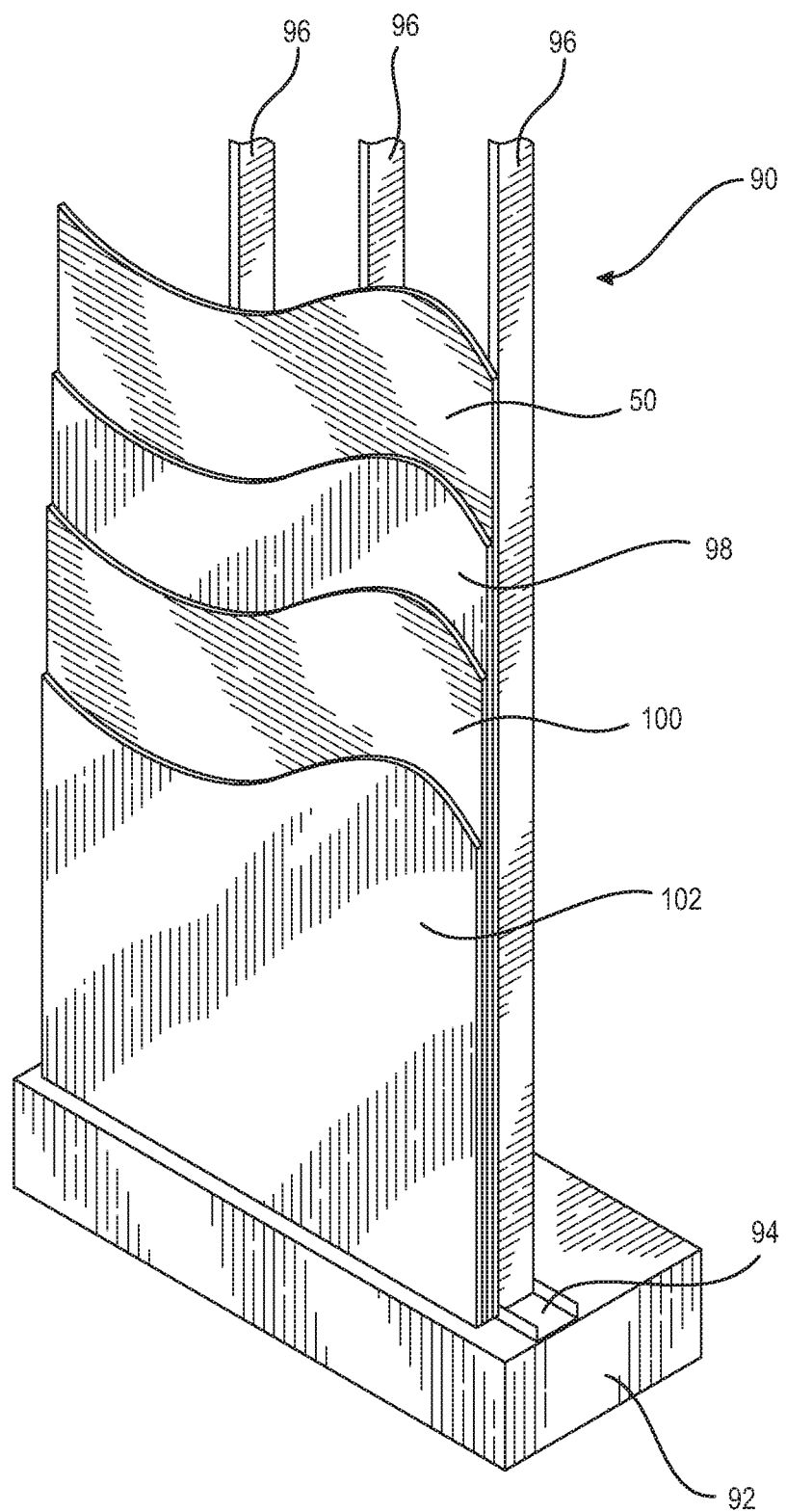
FIG. 4 is a schematic view of the blast panel of FIG. 1 installed on a framing structure with a plurality of finishing materials.

Referring now to FIG. 4, an embodiment of a framed wall structure 90 is shown where the wall structure is mounted on a foundation wall 92. In this embodiment, the wall structure 90 includes a bottom support 94 made of metal or wood and a plurality of intermediate supports 96 oriented vertically and attached to the bottom support 94. Although not shown, a top support is attached to the ends of the intermediate supports 96 opposite to the bottom support 94 to form the framed wall structure 90. In the illustrated embodiment, the blast panel 50 is attached directly to the intermediate supports 96, the top support and the bottom support 94 of the framed wall structure 90. An adhesive 98 is then applied to the surfaces of the blast panels 50. Alternatively, an insulating material (not shown) may be applied to or attached to the surfaces of the blast panels 50 instead of the adhesive. After the adhesive 98 is applied to the blast panels 50, a lathing, such as a mesh material 100, is placed on and adhered to the blast panels by the adhesive 98 to secure the lathing to the blast panels. Next, a plaster or other finish coating 102 is applied to the mesh material 100 to finish the surfaces of the blast panels 50. The finishing materials applied to the surfaces of the blast panels 50 provide a finished appearance to the wall structure 90 for aesthetic purposes. It should be appreciated that any suitable finishing materials may be applied to the blast panel surfaces. Also, the finished wall shown in FIG. 4 may be installed on an inner side, an outer side or both the inner and outer sides of the framed wall structure 90.

While particular embodiments of the present blast panel have been described herein, it will be appreciated by those skilled in the art that changes and modifications may be made thereto without departing from the invention in its broader aspects and as set forth in the following claims.

The invention claimed is:

1. A wall for a building, comprising:
   a framed wall structure including a top support, a bottom support, and opposing side supports connected together, and at least one intermediate support attached to said top support and said bottom support; and
   a blast panel including a core comprised of a cementitious material including fiberglass fibers attached to said framed wall structure, said core including a first surface that is attached to said framed wall structure and a second, opposing surface that is an exposed surface devoid of any reinforcing structure,
   wherein said blast panel is configured to withstand forces up to 10 psi/89 psi-ms.

2. The wall of claim 1, wherein said cementitious material is a cement-gypsum binder including alkali-resistant fiberglass fibers.

3. The wall of claim 1, further comprising a plurality of said blast panels attached to said framed wall structure.

4. The wall of claim 1, further comprising a plurality of said blast panels attached to opposing sides of said framed wall structure.

5. The wall of claim 1, further comprising a plurality of said blast panels attached to a first side of said framed wall structure, and a plurality of wallboard panels attached to a second, opposing side of said framed wall structure.

6. The wall of claim 1, further comprising a plurality of said blast panels attached to said framed wall structure, and at least one of said blast panels attached to said plurality of said blast panels.

7. The wall of claim 1, further comprising a first plurality of said blast panels attached to said framed wall structure, and a second plurality of said blast panels attached to said first plurality of said blast panels.

8. The wall of claim 1, further comprising at least one finishing material attached to said blast panel.

9. The wall of claim 8, wherein said finishing material includes at least one of: an adhesive, an insulating material, a mesh material and a plaster material.

10. A modular assembly for a building, the modular assembly comprising:
    a plurality of framed wall structures secured to each other, each of said framed wall structures including a top support, a bottom support, and opposing side supports connected together and at least one intermediate support attached to said top support and said bottom support; and
    a blast panel including a core comprised of a cementitious material including fiberglass fibers attached to at least one of said plurality of framed wall structures, said core including a first surface that is attached to said at least one of said plurality of framed wall structures and an second opposing surface that is an exposed surface devoid of any reinforcing structure,
    wherein said blast panel is configured to withstand forces up to 10 psi/89 psi-ms.

11. The modular assembly of claim 10, further comprising a plurality of said blast panels attached to a first side of each of said framed wall structures.

12. The modular assembly of claim 10, further comprising at least one blast panel attached to each of said plurality of framed wall structures.

13. The modular assembly of claim 11, wherein said cementitious material is a cement-gypsum binder including alkali-resistant fiberglass fibers.

14. The modular assembly of claim 11, further comprising a plurality of said blast panels attached to a second side of each of said framed wall structures.

15. The modular assembly of claim 11, further comprising a plurality of wallboard panels attached to a second side of each of said framed wall structures.

\* \* \* \* \*